(12) United States Patent
Zamora Ramos et al.

(10) Patent No.: US 12,184,622 B2
(45) Date of Patent: Dec. 31, 2024

(54) ON-PREMISES AUGMENTED AND VIRTUAL REALITY PROCESSING AND PRIVACY PRESERVING INFRASTRUCTURE

(71) Applicant: Intel Corporation, Santa Clara, CA (US)

(72) Inventors: Ernesto Zamora Ramos, Folsom, CA (US); Kylan Race, Austin, TX (US); Jeremy Bottleson, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 179 days.

(21) Appl. No.: 17/936,036

(22) Filed: Sep. 28, 2022

(65) Prior Publication Data

US 2024/0106805 A1    Mar. 28, 2024

(51) Int. Cl.
*H04L 29/06* (2006.01)
*G06T 7/70* (2017.01)
*G06V 20/40* (2022.01)
*G10L 25/57* (2013.01)
*H04L 9/00* (2022.01)
*H04L 9/40* (2022.01)

(52) U.S. Cl.
CPC ............ *H04L 63/0428* (2013.01); *G06T 7/70* (2017.01); *G06V 20/40* (2022.01); *G10L 25/57* (2013.01); *H04L 9/008* (2013.01); *G06T 2207/10016* (2013.01)

(58) Field of Classification Search
None
See application file for complete search history.

(56) References Cited

U.S. PATENT DOCUMENTS 10,938,781 B2 *   3/2021   Schiappa ............ H04L 63/0428
11,443,182 B2 *   9/2022   Gu ......................... G06N 3/063
(Continued)

OTHER PUBLICATIONS

Erkin, Zekeriya et al. Generating Private Recommendations Efficiently Using Homomorphic Encryption and Data Packing. IEEE Transactions on Information Forensics and Security, vol. 7, Issue: 3. https://ieeexplore.ieee.org/stamp/stamp.jsp?tp=&arnumber=6168832 (Year: 2012).*

(Continued)

*Primary Examiner* — Jeremiah L Avery
(74) *Attorney, Agent, or Firm* — Compass IP Law PC (57) ABSTRACT

A method comprises receiving, from a remote device, an audio/video input signal, identifying one or more objects in the audio/video input signal tagged as a sensitive object, evaluating a set of workload requirements for a set of processing workloads comprising portions of the audio/video input signal, selecting one or more heavy processing workloads in the set of processing workloads to send to a compute service provider, in response to a determination that the one or more heavy processing workloads comprises one or more objects tagged as a sensitive object, encrypting the one or more objects tagged as a sensitive object using a homomorphic encryption protocol to generate a first homomorphically encrypted string, and sending the first homomorphically encrypted string to the compute service provider via a privacy protected communication channel.

21 Claims, 5 Drawing Sheets

(56) References Cited

U.S. PATENT DOCUMENTS

| | | | | |
|---|---|---|---|---|
| 2014/0304505 | A1* | 10/2014 | Dawson | G06F 21/6227 |
| | | | | 713/165 |
| 2018/0089449 | A1* | 3/2018 | Boudreau | H04L 63/0227 |
| 2018/0350180 | A1* | 12/2018 | Onischuk | G07C 13/00 |
| 2020/0204527 | A1* | 6/2020 | Vass | H04L 63/0428 |
| 2022/0191247 | A1* | 6/2022 | Dhoble | H04L 9/3226 |
| 2022/0292221 | A1* | 9/2022 | Sohail | H04L 63/105 |

OTHER PUBLICATIONS

Coppolino, Luigi et al. VISE: Combining Intel SGX and Homomorphic Encryption for Cloud Industrial Control Systems. IEEE Transactions on Computers, vol. 70, Issue 5.https://ieeexplore.ieee.org/stamp/stamp.jsp?tp=&arnumber=9095418 (Year: 2021).*

Bringer, Julien et al. Privacy-Preserving Biometric Identification Using Secure Multiparty Computation: An Overview and Recent Trends. IEEE Signal Processing Magazine, vol. 30, Issue: 2. https://ieeexplore.ieee.org/stamp/stamp.jsp?tp=&arnumber=6461629 (Year: 2013).*

* cited by examiner

ON-PREMISES AUGMENTED AND VIRTUAL REALITY PROCESSING AND PRIVACY PRESERVING INFRASTRUCTURE

BACKGROUND

Subject matter described herein relates generally to the field of computer security and more particularly to technologies to implement on-premises augmented and virtual reality processing and privacy preserving infrastructure.

Compute requirements for augmented reality (AR) and virtual reality (VR) are significantly large that large, uncomfortable headsets are required to handle the compute loads. Additionally modern VR/AR headsets contain cameras and microphones to collect local information which is sent to cloud service providers to enable a number of useful services and features but creates a significant privacy and security risk. Accordingly, techniques to implement on premises augmented and virtual reality processing and privacy preserving infrastructure may find utility.

BRIEF DESCRIPTION OF THE DRAWINGS

The detailed description is described with reference to the accompanying figures.

DETAILED DESCRIPTION

Described herein are exemplary systems and methods to implement on-premises augmented and virtual reality processing and privacy preserving infrastructure. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As described briefly above, compute requirements for augmented reality (AR) and virtual reality (VR) are significantly large that large, uncomfortable headsets are required to handle the compute loads. Additionally modern VR/AR headsets contain cameras and microphones to collect local information which is sent to cloud service providers to enable a number of useful services and features, but creates a significant privacy and security risk. Most AR and VR headsets are equipped with microphones and cameras that constantly capture the environment surrounding the user. Further, AR and VR applications often run on servers managed by compute service providers and, while all that information is sent over secure communication channels, as is standard today, when it arrives to the service providers, it gets decrypted, analyzed, and may be subject to unauthorized viewing and/or retention.

In some instances, a user may be producing and sending location, video, audio, and all other kinds of extremely sensitive and identifiable information. A user needs to blindly trust service providers to protect and maintain their data. Service providers can use personal data for their own purposes, or even sell it, in the best-case scenario. Worse cases include attacks to service providers that cause data leaks. These conditions are detrimental to user privacy and are even worse for the enterprise sector.

To address these and other issues, described herein are systems and methods to implement on premises augmented and virtual reality processing and privacy preserving infrastructure. In accordance with some examples, subject matter described herein provides an on-premises infrastructure for handling the majority compute needs for users of AR and/or VR headsets. In some examples this infrastructure may comprise a dedicated local home station node peered to the AR/VR headsets for handling rendering and heavy artificial intelligence (AI) computations. Orchestration software may enable multiple headsets to utilize a station node, and node may comprise communication capabilities for offloading the heaviest computations/internet access to the cloud via privacy-preserving communication links.

Figure 1:
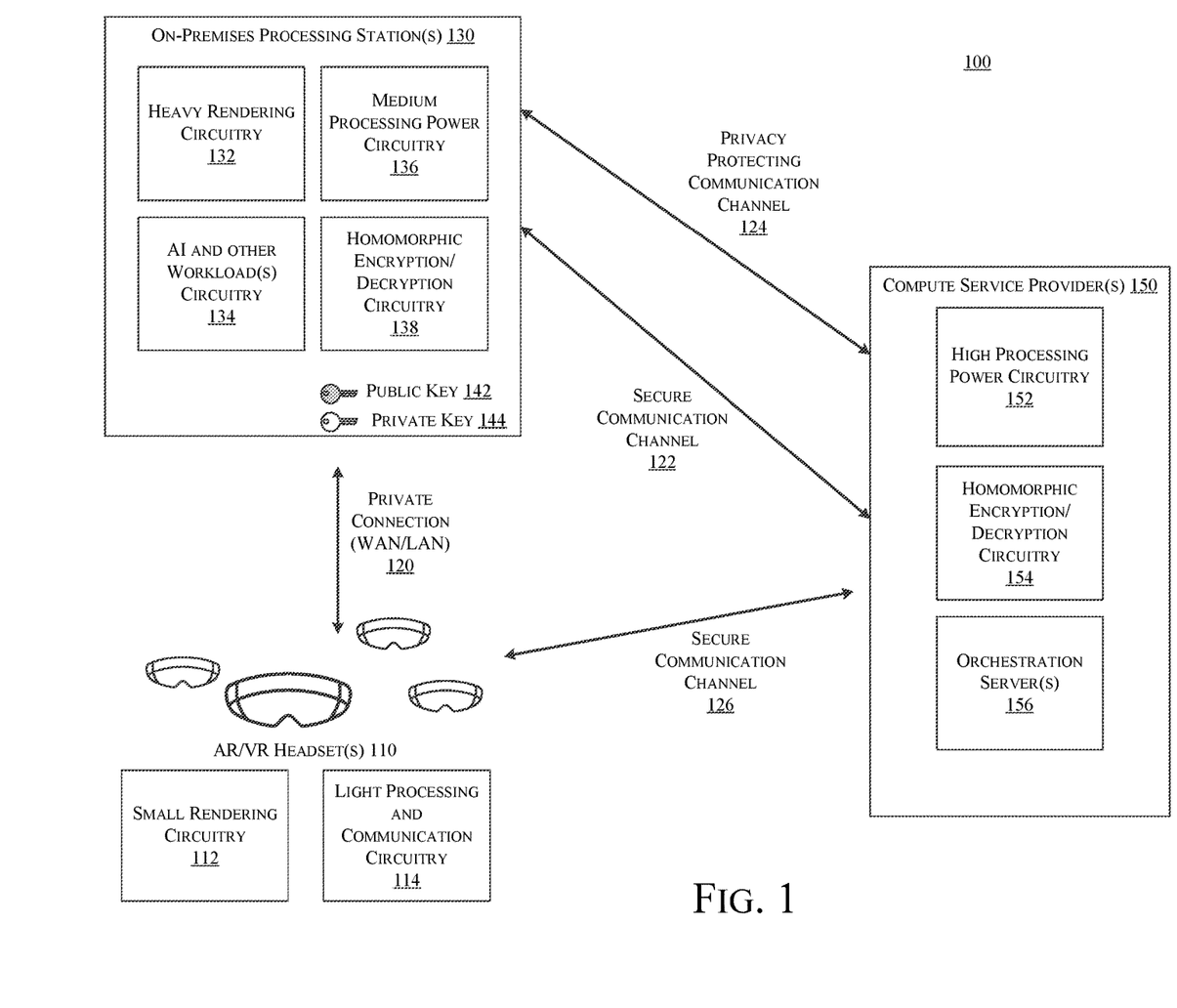
FIG. 1 is a schematic, block diagram illustration of components of apparatus to implement on-premises augmented and virtual reality processing and privacy preserving infrastructure in accordance with some examples.

Subject matter described herein limits or eliminates the possibility of compute service providers even obtaining access to user's sensitive data. In some examples an infrastructure configuration comprises an on-premises (i.e., home) station node comprising of one or more workstations dedicated to AR/VR operations. The home station resides in the local premises, keeping the user data private and only accesses the wider internet via privacy preserving channels. Further structural and methodological details are relating to implementing a privacy preserving digital personal assistant are described below with reference to FIG. 1 through FIG. 5, below FIG. 1 is a schematic, block diagram illustration of components in an environment 100 to implement on premises augmented and virtual reality processing and privacy preserving infrastructure in accordance with some examples. Referring to FIG. 1, in some examples, environment 100 comprises one or more AR/VR headsets 110, one or more on premises processing station(s) 130, and one or more compute service provider(s) 150.

In some examples the AR/VR headsets 110 may comprise, among other components, a small rendering circuitry component 112 to perform light-duty graphics rendering operations. In addition, the AR/VR headsets 110 may comprise light-duty processing and communication circuitry components 114 to perform relatively small processing tasks and to manage communication with other devices.

In some examples the on-premises processing station(s) 130 may comprise, among other components, one or more heavy rendering circuitry components 132 to perform graphics processing workloads that require a significant amount of processing power and one or more artificial intelligence (AI) (and other workload) processing circuitry components 134 to perform artificial intelligence related processing workloads. In addition, the on-premises processing station(s) 130 may comprise one or more medium processing power circuitry components 136 to perform processing tasks that require more processing power than available in the AR/VR headsets 110 and a homomorphic encryption/decryption circuitry component 138 to perform homomorphic encryption and/or decryption of data using either a private encryption key 142 or a public encryption key 144.

In some examples the compute service provider(s) 150 may comprise, among other components, one or more high processing power circuitry components to perform processing workloads that require more processing power than available in the AR/VR headsets or the processing components of the on-premises processing station(s) 130. In addition, the compute service provider(s) 150 may comprise a homomorphic encryption/decryption circuitry component 154 to perform homomorphic encryption and/or decryption of data using a public encryption key 144. Further, compute service provider(s) 150 may comprise one or more orchestration server(s) 156 to facilitate cooperation of the various components of the compute environment 100.

In some examples the AR/VR headset(s) may be communicatively coupled to the on-premises processing station(s) 130 by one or more private communication connections such as, e.g., a wide area network (WAN), the Internet, and/or a local area network (LAN) 120. In some examples the AR/VR headsets 110 may be paired directly to the on-premises home station(s) 130. In other examples the orchestration server(s) 156 may facilitate establishing peer-to-peer communication connections between the AR/VR headsets 110 and the on-premises processing station(s) 120. Similarly, the AR/VR headsets may be communicatively coupled to the one or more compute service provider(s) 150 via a secure communication channel 126 such as, e.g., an internet-based encrypted communication channel, which may be managed by orchestration server(s) 156.

In some examples the on-premises processing station(s) 130 may be communicatively coupled to the one or more compute service provider(s) 150 via a secure communication channel 122 such as, e.g., an internet-based encrypted communication channel. In addition, the on-premises processing station(s) 130 may be communicatively coupled to the one or more compute service provider(s) 150 via a privacy protecting communication channel 124, details of which are discussed below.

By way of overview, in operation most heavy rendering and AI workloads that the AR/VR headset 110 applications require may be performed locally at the on-premises processing station(s) 130. Extra orchestration software may be implemented to link several stations 130 into a node for additional processing power. When the full power of compute service provider(s) 150 is required to perform demanding computations, or when access to global databases or services is needed, the on-premises processing station(s) 130 may offload tasks to the compute service provider(s) (CSP) 150.

Figure 2:
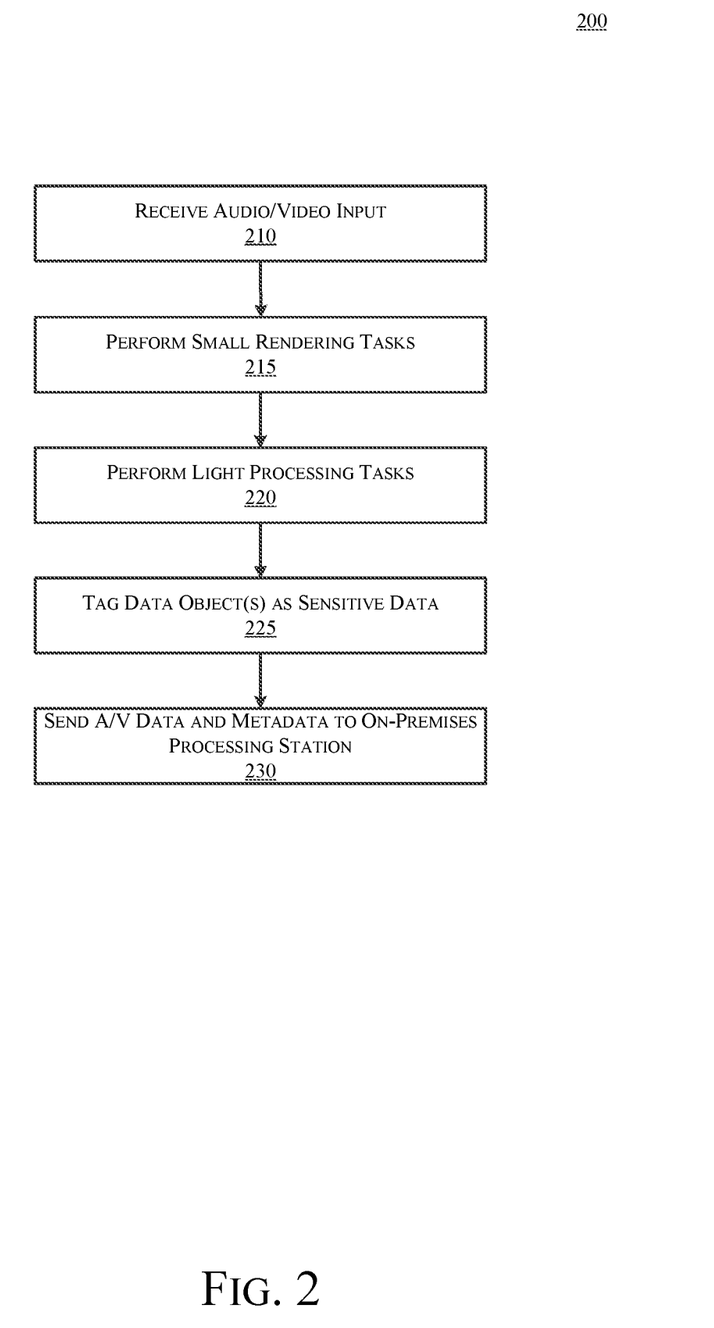
FIG. 2 is a flowchart illustrating operations in a method to implement on-premises augmented and virtual reality processing and privacy preserving infrastructure in accordance with some examples.

FIG. 2 is a flowchart illustrating operations in a method to implement on premises augmented and virtual reality processing and privacy preserving infrastructure in accordance with some examples. More particularly, FIG. 2 provides an illustration of operations that may be implemented by the AR/VR headsets 110. Referring to FIG. 2, in operation 210 one or more of the AR/VR headsets 110 may receive an audio/video (A/V) input. For example, the audio input may be received by one or more microphones on the AR/VR headsets 110 and the video input may be received by one or more video input devices (e.g., cameras) on the AR/VR headset 110. The audio/video input may be embodied as an encoded data stream transmitted via the WAN/Lan connection 120. The encoded data stream may comprise additional information useful for AR/VR processing. Examples of such additional information may comprise time stamp information, location information, lighting information, and the like.

At operation 215 the AR/VR headset(s) 110 may perform one or more small rendering or other graphics processing tasks, and at operation 220 the AR/VR headsets may perform one or more light processing tasks. Suitable tasks may comprise graphical user interface (GUI) tasks including menus, dialogs, on-screen 2D text, etc., displaying results (e.g., displaying remote renders), heads up display (HUD) rendering, simple augmented reality display/highlights, small local renders, etc., running local applications, input capture, interpreting and preparing remote results for presentation, location services, communication, etc.

At operation 225 the AR/VR headset(s) 110 may tag one or more objects in the audio/video input data received in operation 210 as a sensitive object. By way of example, one or more users of an AR/VR headset may wish to have their speech characteristics tagged as sensitive so they cannot be identified by speech recognition algorithms operating (possibly surreptitiously) in compute service providers 150. In such circumstances, a user may provide a speech sample, which may be analyzed, and one or more speech characteristic parameters may be stored in a memory of the AR/VR headsets 110. In operation, the AR/VR headsets may detect speech characteristics of voices in the audio input, perform a voice characteristic analysis, and tag as sensitive speech data that has speech characteristics that match the speech characteristics of a sample in memory. Similarly, one or more users of the AR/VR headset 110 may wish to have certain objects or physical locations tagged as sensitive data so that video streams of the objections or physical locations are not subject to potential compromise (possibly surreptitiously) by algorithms operating in compute service providers 150. In such circumstances, the AR/VR headsets may detect object characteristics in the video stream or physical location information (e.g., metadata) in the video stream and tag any appropriate objects or locations as sensitive objects or locations. In some examples all audio/video input data may be designated as sensitive by default.

At operation 230 the AR/VR headsets 110 send the audio/video data and the associated metadata to the on-premises processing station 130, e.g., via the WAN/LAN connection 120.

In some examples, the on-premises processing station(s) 130 perform as much processing work as possible with the data captured by the AR/VR headset(s) 110 since it may include data representing objects that are considered user sensitive. Sensitive data should be transmitted to the compute service provider(s) 150 only via the privacy protecting communication channel (PPCC) 124 and only when necessary. Examples of situations in which it may be necessary to forward data to compute service providers 150 may include, but are not limited to, query of global databases, such as Internet searches; or communication with other users; or when location services are requested; or heavier processing power than what the on-premises processing station(s) 130 can provide is required, like when advanced artificial intelligence (AI) algorithms and/or neural networks are needed for speech recognition, natural language processing, 3D reconstruction, etc.

In some examples, algorithms that transmit data using the privacy protecting communication channel 124 may transmit lightweight data and metadata to avoid large data dumps over the privacy protecting communication channel 124. Such information is then used by the home station and/or headset to request the bulk data transfers of assets and information through the secure communications channel 122 without having to expose sensitive data. In some scenarios metadata can be used to reconstruct results of operations. For example, in a 3D reconstruction scenario, the on-premises node could send the input for the 3D reconstruction algorithm to an external (cloud) service provider (input could be a stereoscopic image of the scene to be reconstructed). The algorithm finds the name, IDs and other characteristics of objects present in the scene, their position, scale, and orientation in 3D space, textures to be used, illumination parameters, etc. The compute service provider 150 would return this metadata that describes the scene (which is lightweight) back to the node instead of the actual models, textures, shaders, etc. (which are heavyweight assets). The node can use the metadata to reconstruct the 3D scene, and request only the assets it needs, if any, from the compute service provider 150. The node can use the metadata to reconstruct the 3D scene, and request only the assets it needs, if any, from the compute service provider 150. Once the 3D scene is reconstructed in the node, the final render is sent to the AR/VR headset 110 for display The privacy protecting communication channel 124 may incur performance impacts due to extra layers of security and encryption. Thus, some implementations may enable the ability to selectively turn off functionality that makes use of the protecting communication channel 124, thus providing the selective ability to sacrifice security for performance.

Figure 3:
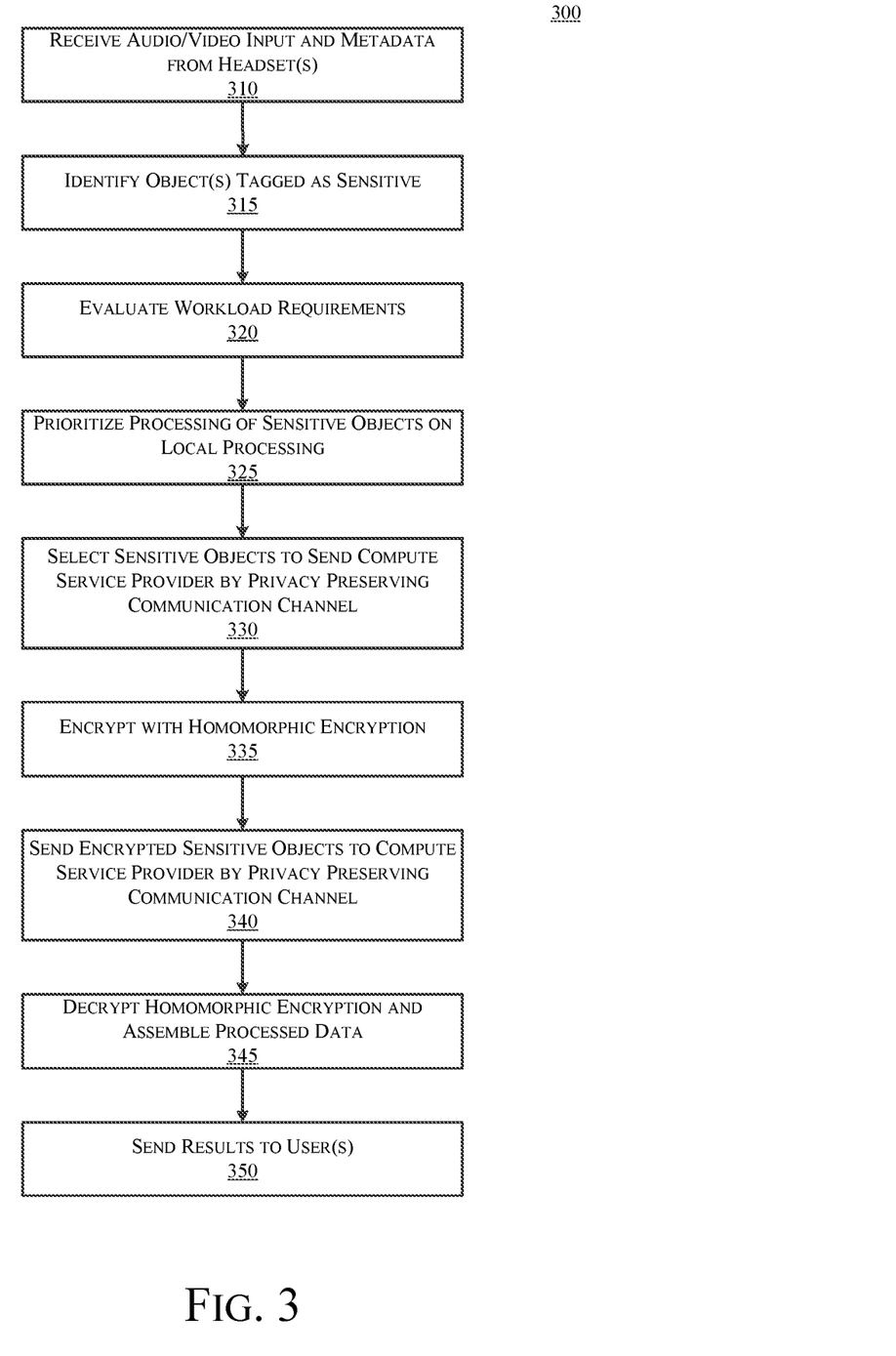
FIG. 3 is a flowchart illustrating operations in a method to implement on-premises augmented and virtual reality processing and privacy preserving infrastructure in accordance with some examples.

FIG. 3 is a flowchart illustrating operations in a method to implement on-premises augmented and virtual reality processing and privacy preserving infrastructure in accordance with some examples. More particularly, FIG. 3 provides an illustration of operations that may be implemented by the on-premises processing station(s) 130. Referring to FIG. 3, at operation 310 an audio/video input and associated metadata from one or more AR/VR headsets 110 communicatively coupled to the on-premises processing station(s) 130. As described above, in some examples the audio/video input may be an audio/video data stream transmitted via WAN/LAN connection 120.

At operation 315 one or more objects that are tagged as sensitive objects may be identified. As described above, in some examples, objects may be identified in metadata transmitted with the audio/video stream. In further examples, metadata may include information, e.g., location information or user information, that enables the on-premises processing station(s) 130 to tag one or more objects as a sensitive object. In further examples, the entire audio/video stream may be tagged as a sensitive object.

At operation 320 one or more workload requirements associated with processing the audio/video input received in operation 310 are evaluated to determine resource requirements. As described above, the on-premises processing station(s) 130 should process as much of the audio/video input as possible, and only processing tasks that cannot be completed by the on-premises processing station(s) 130 should be outsourced to the compute service provider(s) 150. Further, at operation 325, processing of sensitive objects may be prioritized on local processing to reduce the likelihood that sensitive objects will be exposed to compute service provider(s) 150.

At operation 330 one or more objects tagged as sensitive may be selected to be send to the compute service provider(s) 150 for processing via the privacy protecting communication channel 124. At operation 335 the data representing the objects selected in operation 330 is encrypted using a homomorphic encryption protocol, e.g., by homomorphic encryption/decryption circuitry 138 to generate a homomorphically encrypted character string. In some examples the data may be encrypted using a public encryption key 142 unique to the on-premises processing station 130. At operation 340 the encrypted data string is sent to the compute service provider(s) 150. In some examples one or more heavy processing workloads that do not comprise one or more objects tagged as a sensitive object may be sent to the remote compute service provider via secure communication channel 122, which is separate from the privacy protected communication channel 124.

The compute service provider(s) 150 process the data transmitted in operation 340 via the privacy protecting communication channel 124 as described with reference to FIG. 4 and return a homomorphically encrypted character string via the privacy protecting communication channel 124. At operation 345 the homomorphically encrypted string received in operation 340 is decrypted, e.g., by homomorphic encryption/decryption circuitry 138 to generate a cleartext data set representing the portion(s) of the audio/video data stream processed by compute service provider(s) 150. This cleartext data may be incorporate into the remaining data processed by on-premises processing station(s) 130 and the compute service provider(s) 150 to generate a processed audio/video data stream. At operation 350 the processed data stream may be sent to users of the environment, e.g., viewers or persons playing a video game or participating in an audio/video conference call.

Figure 4:
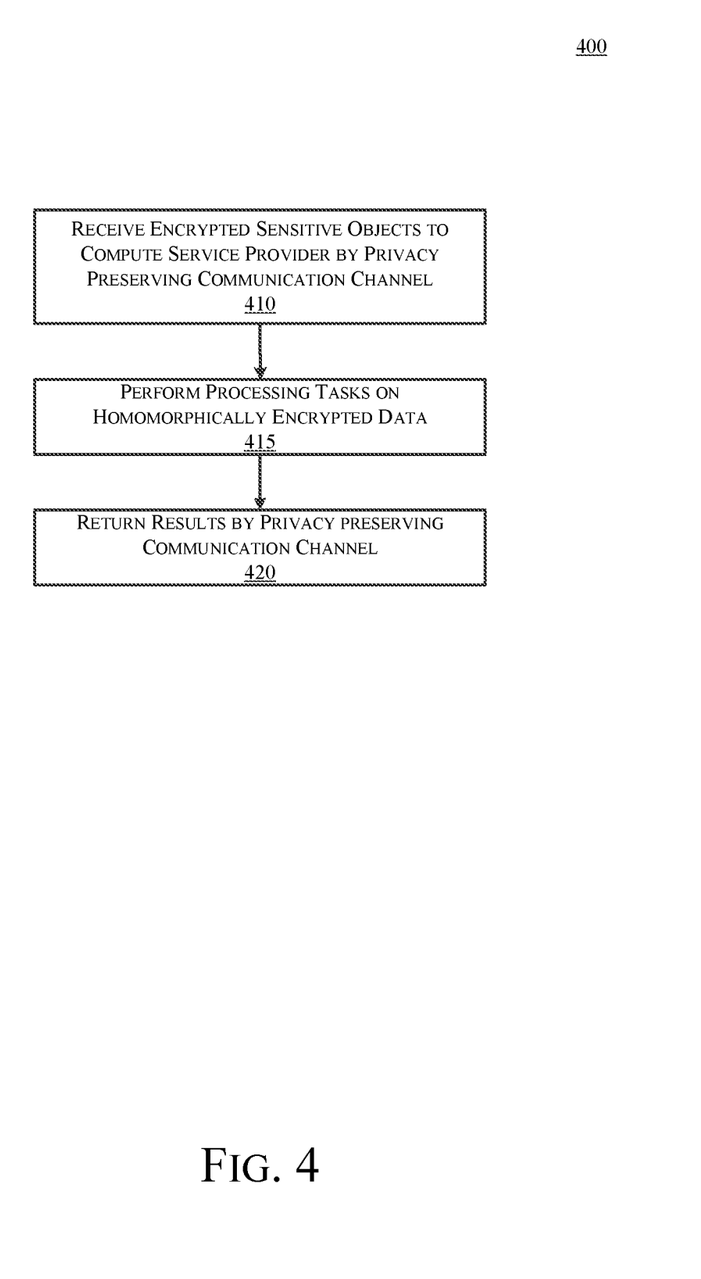
FIG. 4 is a flowchart illustrating operations in a method to implement on-premises augmented and virtual reality processing and privacy preserving infrastructure in accordance with some examples.

FIG. 4 is a flowchart illustrating operations in a method to implement a privacy preserving digital personal assistant in accordance with some examples. More particularly, FIG. 4 provides an illustration of operations that may be implemented by the compute service provider(s) 150. Referring to FIG. 4, at operation 410 the compute service provider(s) receive the homomorphically encrypted character string sent by the on-premises processing station(s) 130 in operation 340. At operation 415 the compute service provider(s) 150 perform processing tasks on the homomorphically encrypted character string that represents the underlying audio/visual data. The processing is performed in the encrypted space and generates a second homomorphically encrypted character string, which is sent back to the on-premises processing station(s) 130 in operation 420 for further processing as described with reference to FIG. 3.

Figure 5:
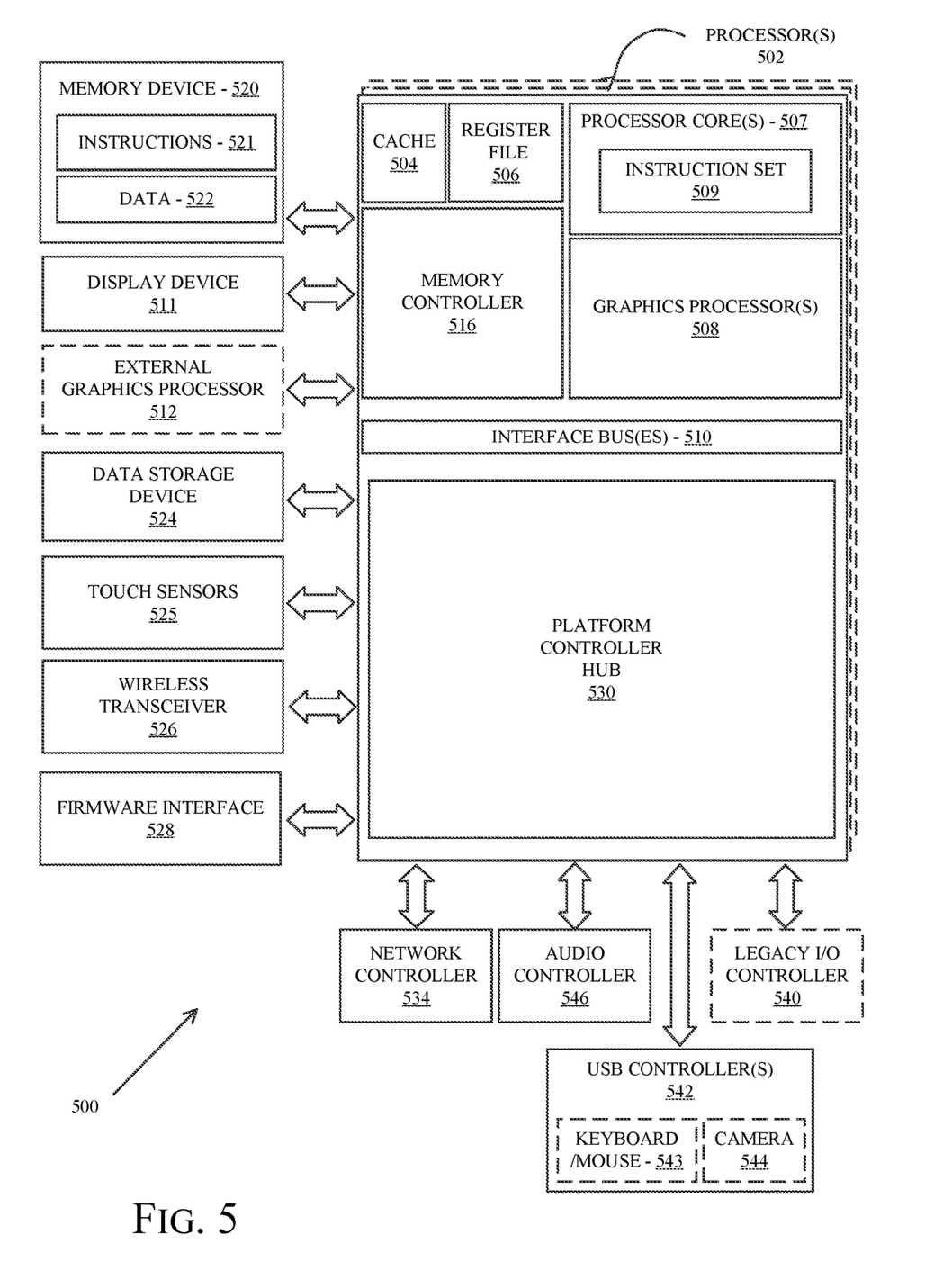
FIG. 5 is a schematic illustration of a computing architecture which may be adapted to implement on-premises augmented and virtual reality processing and privacy preserving infrastructure in accordance with some examples.

In some examples the privacy protecting communication channel 124 may be facilitate by using isolation technologies such as Secure Enclaves or Trusted Execution Environments (TEE). This can be implemented using a virtual machine and/or hypervisor, however software-only virtualization can result in security issues stemming from the operating system and/or hypervisor code being included in the Trusted Computing Base (TCB). A common mitigation to address this issue is the enablement of hardware-assisted trusted execution environments which expose a smaller trusted computing base while using dedicated hardware. These secure areas allow for workloads to be carried out without leaking details outside of the trusted computing base. Performance losses are lower using trusted execution environments due to the lower compute and memory requirements and the use of dedicated hardware. However, the downside introduced is that users wanting to benefit from a trusted execution environment based service must trust the owner/creator of the trusted execution environment with their privacy FIG. 5 illustrates an embodiment of an exemplary computing architecture that may be suitable for implementing various embodiments as previously described. In various embodiments, the computing architecture 500 may comprise or be implemented as part of an electronic device. In some embodiments, the computing architecture 500 may be representative, for example of a computer system that implements one or more components of the operating environments described above. In some embodiments, computing architecture 500 may be representative of one or more portions or components of a digital signature signing system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 includes one or more processors 502 and one or more graphics processors 508, and may be a single processor desktop system, a multiprocessor workstation system, or a server system having a large number of processors 502 or processor cores 507. In on embodiment, the system 500 is a processing platform incorporated within a system-on-a-chip (SoC or SOC) integrated circuit for use in mobile, handheld, or embedded devices.

An embodiment of system 500 can include, or be incorporated within, a server-based gaming platform, a game console, including a game and media console, a mobile gaming console, a handheld game console, or an online game console. In some embodiments system 500 is a mobile phone, smart phone, tablet computing device or mobile Internet device. Data processing system 500 can also include, couple with, or be integrated within a wearable device, such as a smart watch wearable device, smart eyewear device, augmented reality device, or virtual reality device. In some embodiments, data processing system 500 is a television or set top box device having one or more processors 502 and a graphical interface generated by one or more graphics processors 508.

In some embodiments, the one or more processors 502 each include one or more processor cores 507 to process instructions which, when executed, perform operations for system and user software. In some embodiments, each of the one or more processor cores 507 is configured to process a specific instruction set 509. In some embodiments, instruction set 509 may facilitate Complex Instruction Set Computing (CISC), Reduced Instruction Set Computing (RISC), or computing via a Very Long Instruction Word (VLIW). Multiple processor cores 507 may each process a different instruction set 509, which may include instructions to facilitate the emulation of other instruction sets. Processor core 507 may also include other processing devices, such a Digital Signal Processor (DSP).

In some embodiments, the processor 502 includes cache memory 504. Depending on the architecture, the processor 502 can have a single internal cache or multiple levels of internal cache. In some embodiments, the cache memory is shared among various components of the processor 502. In some embodiments, the processor 502 also uses an external cache (e.g., a Level-3 (L3) cache or Last Level Cache (LLC)) (not shown), which may be shared among processor cores 507 using known cache coherency techniques. A register file 506 is additionally included in processor 502 which may include different types of registers for storing different types of data (e.g., integer registers, floating point registers, status registers, and an instruction pointer register). Some registers may be general-purpose registers, while other registers may be specific to the design of the processor 502.

In some embodiments, one or more processor(s) 502 are coupled with one or more interface bus(es) 510 to transmit communication signals such as address, data, or control signals between processor 502 and other components in the system. The interface bus 510, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 502 include an integrated memory controller 516 and a platform controller hub 530. The memory controller 516 facilitates communication between a memory device and other components of the system 500, while the platform controller hub (PCH) 530 provides connections to I/O devices via a local I/O bus.

Memory device 520 can be a dynamic random-access memory (DRAM) device, a static random-access memory (SRAM) device, flash memory device, phase-change memory device, or some other memory device having suitable performance to serve as process memory. In one embodiment the memory device 520 can operate as system memory for the system 500, to store data 522 and instructions 521 for use when the one or more processors 502 executes an application or process. Memory controller hub 516 also couples with an optional external graphics processor 512, which may communicate with the one or more graphics processors 508 in processors 502 to perform graphics and media operations. In some embodiments a display device 511 can connect to the processor(s) 502. The display device 511 can be one or more of an internal display device, as in a mobile electronic device or a laptop device or an external display device attached via a display interface (e.g., DisplayPort, etc.). In one embodiment the display device 511 can be a head mounted display (HMD) such as a stereoscopic display device for use in virtual reality (VR) applications or augmented reality (AR) applications.

In some embodiments the platform controller hub 530 enables peripherals to connect to memory device 520 and processor 502 via a high-speed I/O bus. The I/O peripherals include, but are not limited to, an audio controller 546, a network controller 534, a firmware interface 528, a wireless transceiver 526, touch sensors 525, a data storage device 524 (e.g., hard disk drive, flash memory, etc.). The data storage device 524 can connect via a storage interface (e.g., SATA) or via a peripheral bus, such as a Peripheral Component Interconnect bus (e.g., PCI, PCI Express). The touch sensors 525 can include touch screen sensors, pressure sensors, or fingerprint sensors. The wireless transceiver 526 can be a Wi-Fi transceiver, a Bluetooth transceiver, or a mobile network transceiver such as a 3G, 4G, or Long Term Evolution (LTE) transceiver. The firmware interface 528 enables communication with system firmware, and can be, for example, a unified extensible firmware interface (UEFI). The network controller 534 can enable a network connection to a wired network. In some embodiments, a high-performance network controller (not shown) couples with the interface bus 510. The audio controller 546, in one embodiment, is a multi-channel high definition audio controller. In one embodiment the system 500 includes an optional legacy I/O controller 540 for coupling legacy (e.g., Personal System 2 (PS/2)) devices to the system. The platform controller hub 530 can also connect to one or more Universal Serial Bus (USB) controllers 542 connect input devices, such as keyboard and mouse 543 combinations, a camera 544, or other USB input devices.

The following pertains to further examples.

Example 1 is an apparatus, comprising processing circuitry to receive, from a remote device, an audio/video input signal; identify one or more objects in the audio/video input signal tagged as a sensitive object; evaluate a set of workload requirements for a set of processing workloads comprising portions of the audio/video input signal; select one or more heavy processing workloads in the set of processing workloads to send to a compute service provider; in response to a determination that the one or more heavy processing workloads comprises one or more objects tagged as a sensitive object: encrypt the one or more objects tagged as a sensitive object using a homomorphic encryption protocol to generate a first homomorphically encrypted string; and send the first homomorphically encrypted string to the compute service provider via a privacy protected communication channel.

In Example 2, the subject matter of Example 1 can optionally include processing circuitry to perform one or more heavy processing workloads using local graphics processing resources.

In Example 3, the subject matter of any one of Examples 1-2 can optionally include processing circuitry to send one or more heavy processing workloads that do not comprise one or more objects tagged as a sensitive object to the remote compute service provider via a secure communication channel, separate from the privacy protected communication channel.

In Example 4, the subject matter of any one of Examples 1-3 can optionally include processing circuitry to encrypt the one or more objects tagged as a sensitive object using a public encryption key.

In Example 5, the subject matter of any one of Examples 1~4 can optionally include processing circuitry to receive, via the privacy protected channel, a second homomorphically encrypted generated by the compute service provider using the first homomorphically encrypted string; decrypt the second homomorphically encrypted string using a private encryption key to generate a cleartext data set representing a product of a processing workload; and send the cleartext data set to the remote device.

In Example 6, the subject matter of any one of Examples 1-5 can optionally processing circuitry to receive, from a user, one or more inputs identifying objects to be tagged as sensitive objects; compare an object in the audio/video input signal to the one or more inputs identifying objects to be tagged as sensitive objects; and tag an object in the audio/video input signal when the object matches one or more inputs identifying objects to be tagged as sensitive objects.

In Example 7, the subject matter of any one of Examples 1-6 can optionally include processing circuitry to receive one or more inputs identifying one or more physical locations in which objects are to be tagged as sensitive objects; compare a location input in the audio/video input signal to the one or more physical locations in which objects are to be tagged as sensitive objects; and tag an object in the audio/video input signal when the object matches one or more physical locations in which objects are to be tagged as sensitive objects.

Example 8 is a computer-based method, comprising receiving, from a remote device, an audio/video input signal;

identifying one or more objects in the audio/video input signal tagged as a sensitive object; evaluating a set of workload requirements for a set of processing workloads comprising portions of the audio/video input signal; selecting one or more heavy processing workloads in the set of processing workloads to send to a compute service provider; in response to a determination that the one or more heavy processing workloads comprises one or more objects tagged as a sensitive object: encrypting the one or more objects tagged as a sensitive object using a homomorphic encryption protocol to generate a first homomorphically encrypted string; and sending the first homomorphically encrypted string to the compute service provider via a privacy protected communication channel.

In Example 9, the subject matter of Example 8 can optionally include performing one or more heavy processing workloads using local graphics processing resources.

In Example 10, the subject matter of any one of Examples 8-9 can optionally include sending one or more heavy processing workloads that do not comprise one or more objects tagged as a sensitive object to the remote compute service provider via a secure communication channel, separate from the privacy protected communication channel.

In Example 11, the subject matter of any one of Examples 8-10 can optionally include encrypting the one or more objects tagged as a sensitive object using a public encryption key.

In Example 12, the subject matter of any one of Examples 8-11 can optionally include receiving, via the privacy protected channel, a second homomorphically encrypted generated by the compute service provider using the first homomorphically encrypted string; decrypting the second homomorphically encrypted string using a private encryption key to generate a cleartext data set representing a product of a processing workload; and sending the cleartext data set to the remote device.

In Example 13, the subject matter of any one of Examples 8-12 can optionally include receiving, from a user, one or more inputs identifying objects to be tagged as sensitive objects; comparing an object in the audio/video input signal to the one or more inputs identifying objects to be tagged as sensitive objects; and tagging an object in the audio/video input signal when the object matches one or more inputs identifying objects to be tagged as sensitive objects.

In Example 14, the subject matter of any one of Examples 8-13 can optionally include receiving one or more inputs identifying one or more physical locations in which objects are to be tagged as sensitive objects; comparing a location input in the audio/video input signal to the one or more physical locations in which objects are to be tagged as sensitive objects; and tagging an object in the audio/video input signal when the object matches one or more physical locations in which objects are to be tagged as sensitive objects.

Example 15 is a non-transitory computer readable medium comprising instructions which, when executed by a processor, configure the processor to receive, from a remote device, an audio/video input signal; identify one or more objects in the audio/video input signal tagged as a sensitive object; evaluate a set of workload requirements for a set of processing workloads comprising portions of the audio/video input signal; select one or more heavy processing workloads in the set of processing workloads to send to a compute service provider; in response to a determination that the one or more heavy processing workloads comprises one or more objects tagged as a sensitive object: encrypt the one or more objects tagged as a sensitive object using a homomorphic encryption protocol to generate a first homomorphically encrypted string; and send the first homomorphically encrypted string to the compute service provider via a privacy protected communication channel.

In Example 16, the subject matter of Example 15 can optionally include the subject matter of claim 15, comprising instructions to perform one or more heavy processing workloads using local graphics processing resources.

In Example 17, the subject matter of any one of Examples 15-16 can optionally include instructions to send one or more heavy processing workloads that do not comprise one or more objects tagged as a sensitive object to the remote compute service provider via a secure communication channel, separate from the privacy protected communication channel.

In Example 18, the subject matter of any one of Examples 15-17 can optionally include instructions to encrypt the one or more objects tagged as a sensitive object using a public encryption key.

In Example 19, the subject matter of any one of Examples 15-18 can optionally include instructions to receive, via the privacy protected channel, a second homomorphically encrypted generated by the compute service provider using the first homomorphically encrypted string; decrypt the second homomorphically encrypted string using a private encryption key to generate a cleartext data set representing a product of a processing workload; and send the cleartext data set to the remote device.

In Example 20, the subject matter of any one of Examples 15-19 can optionally include instructions to receive, from a user, one or more inputs identifying objects to be tagged as sensitive objects; compare an object in the audio/video input signal to the one or more inputs identifying objects to be tagged as sensitive objects; and tag an object in the audio/video input signal when the object matches one or more inputs identifying objects to be tagged as sensitive objects.

In Example 21, the subject matter of any one of Examples 15-20 can optionally include instructions to receive one or more inputs identifying one or more physical locations in which objects are to be tagged as sensitive objects; compare a location input in the audio/video input signal to the one or more physical locations in which objects are to be tagged as sensitive objects; and tag an object in the audio/video input signal when the object matches one or more physical locations in which objects are to be tagged as sensitive objects.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
   processing circuitry to:
      receive, from a remote device, an audio/video input signal;
      identify one or more objects in the audio/video input signal tagged as a sensitive object;
      evaluate a set of workload requirements for a set of processing workloads comprising portions of the audio/video input signal;
      select one or more heavy processing workloads in the set of processing workloads to send to a compute service provider;
      in response to a determination that the one or more heavy processing workloads comprises one or more objects tagged as a sensitive object:
         encrypt the one or more objects tagged as a sensitive object using a homomorphic encryption protocol to generate a first homomorphically encrypted string; and
         send the first homomorphically encrypted string to the compute service provider via a privacy protected communication channel.

2. The apparatus of claim 1, comprising processing circuitry to:
   perform one or more heavy processing workloads using local graphics processing resources.

3. The apparatus of claim 2, the processing circuitry to:
   send one or more heavy processing workloads that do not comprise one or more objects tagged as a sensitive object to the compute service provider via a secure communication channel, separate from the privacy protected communication channel.

4. The apparatus of claim 1, the processing circuitry to:
encrypt the one or more objects tagged as a sensitive object using a public encryption key.

5. The apparatus of claim 1, the processing circuitry to:
receive, via the privacy protected communication channel, a second homomorphically encrypted generated by the compute service provider using the first homomorphically encrypted string;
decrypt the second homomorphically encrypted string using a private encryption key to generate a cleartext data set representing a product of a processing workload; and
send the cleartext data set to the remote device.

6. The apparatus of claim 1, further comprising processing circuitry to:
receive, from a user, one or more inputs identifying objects to be tagged as sensitive objects;
compare an object in the audio/video input signal to the one or more inputs identifying objects to be tagged as sensitive objects; and
tag an object in the audio/video input signal when the object matches one or more inputs identifying objects to be tagged as sensitive objects.

7. The apparatus of claim 1, further comprising processing circuitry to:
receive one or more inputs identifying one or more physical locations in which objects are to be tagged as sensitive objects;
compare a location input in the audio/video input signal to the one or more physical locations in which objects are to be tagged as sensitive objects; and
tag an object in the audio/video input signal when the object matches one or more physical locations in which objects are to be tagged as sensitive objects.

8. A computer-based method, comprising:
receiving, from a remote device, an audio/video input signal;
identifying one or more objects in the audio/video input signal tagged as a sensitive object;
evaluating a set of workload requirements for a set of processing workloads comprising portions of the audio/video input signal;
selecting one or more heavy processing workloads in the set of processing workloads to send to a compute service provider;
in response to a determination that the one or more heavy processing workloads comprises one or more objects tagged as a sensitive object:
encrypting the one or more objects tagged as a sensitive object using a homomorphic encryption protocol to generate a first homomorphically encrypted string; and
sending the first homomorphically encrypted string to the compute service provider via a privacy protected communication channel.

9. The method of claim 8, further comprising:
performing one or more heavy processing workloads using local graphics processing resources.

10. The method of claim 9, further comprising:
sending one or more heavy processing workloads that do not comprise one or more objects tagged as a sensitive object to the compute service provider via a secure communication channel, separate from the privacy protected communication channel.

11. The method of claim 8, further comprising:
encrypting the one or more objects tagged as a sensitive object using a public encryption key.

12. The method of claim 8, further comprising:
receiving, via the privacy protected communication channel, a second homomorphically encrypted generated by the compute service provider using the first homomorphically encrypted string;
decrypting the second homomorphically encrypted string using a private encryption key to generate a cleartext data set representing a product of a processing workload; and
sending the cleartext data set to the remote device.

13. The method of claim 8, further comprising:
receiving, from a user, one or more inputs identifying objects to be tagged as sensitive objects;
comparing an object in the audio/video input signal to the one or more inputs identifying objects to be tagged as sensitive objects; and
tagging an object in the audio/video input signal when the object matches one or more inputs identifying objects to be tagged as sensitive objects.

14. The method of claim 12, further comprising:
receiving one or more inputs identifying one or more physical locations in which objects are to be tagged as sensitive objects;
comparing a location input in the audio/video input signal to the one or more physical locations in which objects are to be tagged as sensitive objects; and
tagging an object in the audio/video input signal when the object matches one or more physical locations in which objects are to be tagged as sensitive objects.

15. A non-transitory computer readable medium comprising instructions which, when executed by a processor, configure the processor to:
receive, from a remote device, an audio/video input signal;
identify one or more objects in the audio/video input signal tagged as a sensitive object;
evaluate a set of workload requirements for a set of processing workloads comprising portions of the audio/video input signal;
select one or more heavy processing workloads in the set of processing workloads to send to a compute service provider;
in response to a determination that the one or more heavy processing workloads comprises one or more objects tagged as a sensitive object:
encrypt the one or more objects tagged as a sensitive object using a homomorphic encryption protocol to generate a first homomorphically encrypted string; and
send the first homomorphically encrypted string to the compute service provider via a privacy protected communication channel.

16. The computer readable medium of claim 15, comprising instructions to:
perform one or more heavy processing workloads using local graphics processing resources.

17. The computer readable medium of claim 16, comprising instructions to:
send one or more heavy processing workloads that do not comprise one or more objects tagged as a sensitive object to the compute service provider via a secure communication channel, separate from the privacy protected communication channel.

18. The computer readable medium of claim 15, comprising instructions to:
 encrypt the one or more objects tagged as a sensitive object using a public encryption key.

19. The computer readable medium of claim 15, comprising instructions to:
 receive, via the privacy protected communication channel, a second homomorphically encrypted generated by the compute service provider using the first homomorphically encrypted string;
 decrypt the second homomorphically encrypted string using a private encryption key to generate a cleartext data set representing a product of a processing workload; and
 send the cleartext data set to the remote device.

20. The computer readable medium of claim 15, comprising instructions to:
 receive, from a user, one or more inputs identifying objects to be tagged as sensitive objects;
 compare an object in the audio/video input signal to the one or more inputs identifying objects to be tagged as sensitive objects; and
 tag an object in the audio/video input signal when the object matches one or more inputs identifying objects to be tagged as sensitive objects.

21. The computer readable medium of claim 20, comprising instructions to:
 receive one or more inputs identifying one or more physical locations in which objects are to be tagged as sensitive objects;
 compare a location input in the audio/video input signal to the one or more physical locations in which objects are to be tagged as sensitive objects; and
 tag an object in the audio/video input signal when the object matches one or more physical locations in which objects are to be tagged as sensitive objects.

* * * * *